Figure 1:
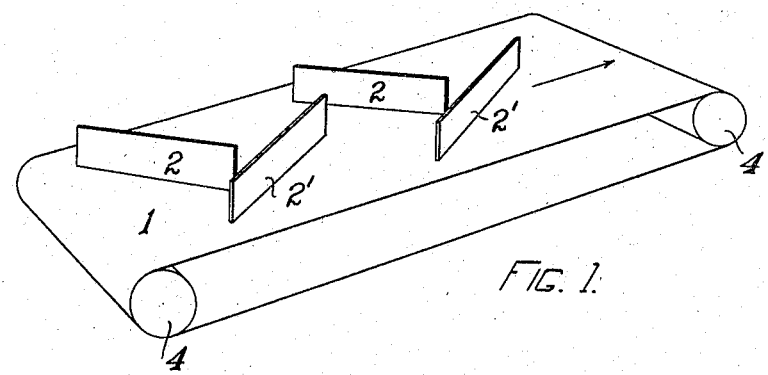

G. H. PETRI.
FORMING MACHINE FOR DOUGH.
APPLICATION FILED MAY 7, 1908.

936,661.

Patented Oct. 12, 1909.

WITNESSES
A. T. Palmer
W. H. Moore

INVENTOR
GUNTHER H. PETRI
BY HIS ATTORNEYS
Mitchell Chadwick & Kent

UNITED STATES PATENT OFFICE.

GUNTHER H. PETRI, OF BOSTON, MASSACHUSETTS.

FORMING-MACHINE FOR DOUGH.

936,661.

Specification of Letters Patent.

Patented Oct. 12, 1909.

Application filed May 7, 1908. Serial No. 431,370.

*To all whom it may concern:*

Be it known that I, GUNTHER H. PETRI, a citizen of the United States, and a resident of Boston, in the county of Suffolk and State of Massachusetts, have invented certain new and useful Improvements in Forming-Machines for Dough, of which the following is a specification.

This invention relates to forming machines for dough and other plastic materials.

More particularly it relates to machines for molding dough, forming a skin thereon and a shape suitable for rolls, loaves of bread, etc.

The object is to improve and simplify apparatus of this sort by eliminating troughs, reciprocating compressors and other features which have characterized apparatus heretofore known and which have had the effect of increasing the cost and complication of apparatus, of concealing the dough from observation while undergoing the process and rendering it not easily accessible for treatment with flour, etc., and which are not easily adjustable to meet the needs of differing sizes of loaves or consistency and quality of dough. These objects are accomplished by apparatus, one embodiment of which is shown herein and another embodiment of which is shown in my accompanying application for patent filed herewith, Serial No. 431,369, in which the main principle consists of the provision of two molding boards, one set edgewise with respect to the other; one being in motion with respect to the other, the motion being in a direction inclined to the line of intersection of the two boards. One of these boards is preferably of ample area and set horizontally, the second is upright close above it, and is preferably divided into detached sections alternately set at opposite angles with respect to the direction of movement of the first board. A mass of dough being placed on the horizontal board is by the motion thereof brought into contact with the upright board. There is nothing covering the dough from view or from access and no parts which embrace or compress the dough. The molding effect is attained by the frictional pull of the under board on the mass and the frictional restraint of the upright barrier board, which (owing to the slight distance between the point of application of the pull to the mass by the under board and the point of application of the resistance offered by the upright board) causes rotating motions to be engendered, which tend to occur both about a vertical axis and a horizontal axis. A resultant rotation follows, carrying the mass along the intersection of the boards, during which the conjoint effect of the pull of the one board, the resistance of the other, the plastic condition of the mass, the weight of the mass and the slip of the surface of the mass upon each of the boards produces internal and external effects upon the mass, forming a skin thereon and shaping it round. The effect will be varied if the angle between the upright board and the motion of the underboard be changed, and the invention comprises simple means for changing this angle. The upright board may have stationary surface, as claimed herein, or moving as in my other application.

The invention also comprises means for applying sidewise compression to the dough, if desired, without abandoning the above-described advantages of easy observation and vertical access, by providing an adjustable choke passage; and by this means also the dough may be formed into and delivered in a final cylindrical shape.

Figure 2:
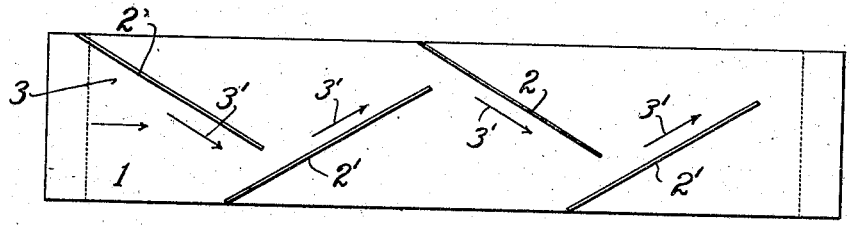
Figure 3:
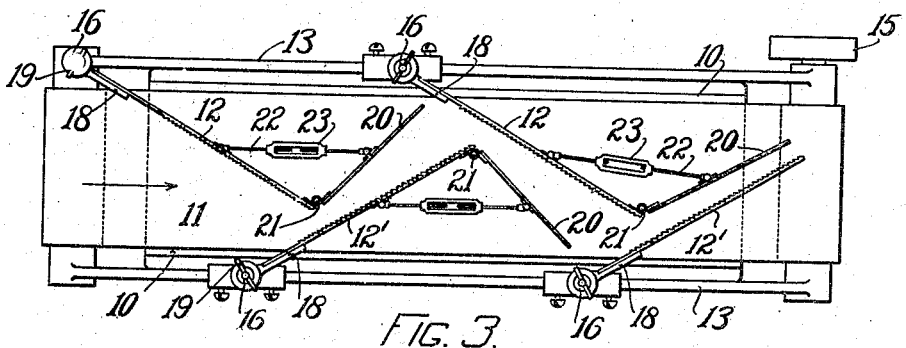
Figure 4:
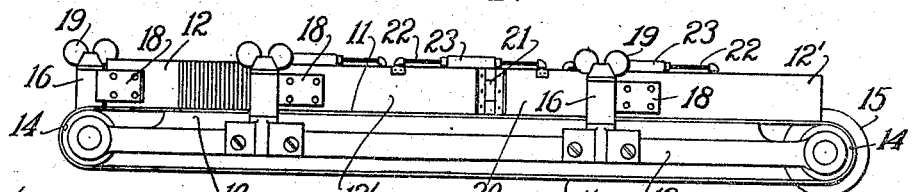

In the accompanying drawings:—Figure 1 represents diagrammatically in perspective an embodiment of the invention; Fig. 2 represents a similar embodiment in plan; Fig. 3 is a plan showing apparatus as it may be constructed to embody the invention; Fig. 4 is a side elevation of the same.

The word "board" is used herein in a broad sense meaning not merely "wood" but any material formed and arranged in accordance herewith. In the drawings the parts 2, 2', 12, 12' may be considered as wooden while the parts 1 and 11 are represented as being of flexible materials such as leather, canvas or felt.

In Figs. 1 and 2 the part 1 represents one molding board which is a horizontal belt or carrier in motion around rollers 4. The other molding board consists of several blades 2, 2' set angularly above it. A mass of dough put on at 3 will travel through the course shown by arrows 3'.

In Fig. 3 is shown a molding board 11 sustained on a bed or platen 10, and upright stationary-surfaced barrier blades 12, 12' which together are herein referred to as constituting a single board divided into sections. The trend or run of the successive sections 12 and 12' is inclined alternately on the opposite sides of the line of motion of board 11 represented by the arrow in Fig. 3. They are set so that after a mass of dough has encountered the first section 12 and been carried to the end thereof, it is then carried forward by the board 11 and immediately encounters on its other side the section 12', which forces it in the opposite direction sidewise and finally delivers it to another section 12. The process is thus repeated, carrying the dough through a zigzag course and rolling it alternately upon different axes of its mass as long as needed to complete its molding and forming. On the frame 13 of the apparatus rollers 14 are journaled, one of them having a driving pulley 15. The carrier belt 11 passes around these rollers. The side frame also supports pins or upright bolt 16 from which arms 18 project, being pivoted thereon and adjustable angularly thereabout, each capable of being fastened in any desired adjustment by thumb-screw 19. These arms hold the molding boards 12 and 12', the faces of which may be roughened with corrugations and teeth as clearly represented in Figs. 3 and 4 for the purpose of offering greater frictional resistance to the dough. At the discharge end of the upright molding boards an extension or wing 20 may be attached as by hinges 21 or otherwise and means may be provided to hold this at any desired angle to the main part of the molding board. The means here shown consist of a rod 22 having a turn-buckle 23. It will be obvious that these wings might be otherwise supported and still perform their function below described, but this is a convenient and simple manner of arranging them. These wings may be adjusted as shown at the right-hand in Fig. 3, forming a gradually contracting throat with one of the upright molding boards or may be adjusted as shown at the left-hand in Fig. 3 where the wing is drawn back out of action. If adjusted to form a throat the turn-buckle permits the wing to be held firmly in such position as to give any desired degree of choking upon a mass of dough passing through such wing and the opposing molding board 12 or 12'. According to the adjustment and the size of the mass, a mass of dough passing through this choke will be compressed somewhat laterally and will be formed into a somewhat cylindrical shape rotating upon its vertical axis, the side in contact with the roughened molding board being retarded more than the side in contact with the opposing wing, which may be made smoother or by any other means less resistant for this purpose.

According to the needs, consistency of dough and size of masses thereof, few or many of the sections 12, 12' may be used; and apparatus may be constructed with as many more similar sections than the number shown in the drawing as occasion shall require. By adjusting the arms 18 about the pivots 16 the molding effect of each section may be varied.

In the claims "line of intersection" means the trend or run of the upright board, or the line wherein its surface would cut the lower molding board if projected thereon, it being understood that the upright board does not actually intersect, nor necessarily rest in contact with the under board. It is also to be understood that the word "horizontal" when applied to the carrier in the claims does not mean absolutely level, but may cover a carrier which is somewhat inclined, provided it be under the dough so that the weight of the dough thereon produces a frictional effect.

I claim:—

1. Apparatus of the class described, comprising two molding boards, one being a carrier board and the other a barrier board set over it and consisting of a series of separate blades having stationary working faces set with their respective lines of intersection with the carrier at successively different angles to the motion of the barrier, and means to set the blades individually at various angles to said motion of the carrier.

2. Apparatus of the class described comprising a flexible belt and cylindrical rolls supporting it with a horizontal molding surface, a frame beside said surface, blades mounted thereon and projecting over said surface, forming sections of a coöperating molding board having an upright face and means to hold said blades in various positions on said frame.

3. Apparatus of the class described, comprising a horizontally moving molding board, a coöperating molding board having an upright face whose intersection with the carrier board is at an angle with the carrier's motion and an auxiliary upright board forming therewith a contracting throat for passage of material.

4. Apparatus of the class described, comprising a horizontally moving molding board, a coöperating molding board having an upright face whose intersection with the carrier board is at an angle with the carrier's motion and an auxiliary upright board forming therewith a contracting throat for passage of material, the said upright molding board being formed of a succession of blades arranged zigzag and the auxiliary board opposing one of them being an extension of the preceding board.

5. Apparatus of the class described, comprising a horizontally moving molding board, a coöperating molding board having an upright face whose intersection with the carrier board is at an angle with the carrier's motion and an auxiliary upright board forming therewith a contracting throat for passage of material, the said upright molding board being formed of a succession of blades arranged zigzag and the auxiliary board opposing one of them being an extension of the preceding board and hinged thereto and there being an extensible strut between said preceding board and its extension.

6. Apparatus of the class described, comprising a horizontally moving molding board, a coöperating molding board having an upright face whose intersection with the carrier board is at an angle with the carrier's motion and an auxiliary upright board forming therewith a contracting throat for passage of material, said auxiliary board having a more frictionless face than its opposing board with which it forms the throat.

7. Apparatus of the class described, comprising two molding boards, one being a carrier for material and the other a barrier therefor, and means to impart motion to one relative to the other in a direction at an angle to the line of their intersection; the barrier being comprised of independent sections arranged alternately at angles on opposite sides of the direction of motion and there being means to change the setting of one section independently of the setting of its adjacent sections.

In testimony whereof I hereto affix my signature, in presence of two witnesses.

GUNTHER H. PETRI.

Witnesses:
JOSEPH T. BRENNAN,
EVERETT E. KENT.